May 13, 1969      J. O. REED      3,443,561
SUBCUTANEOUS IMPLANT DEVICE
Filed Aug. 23, 1966
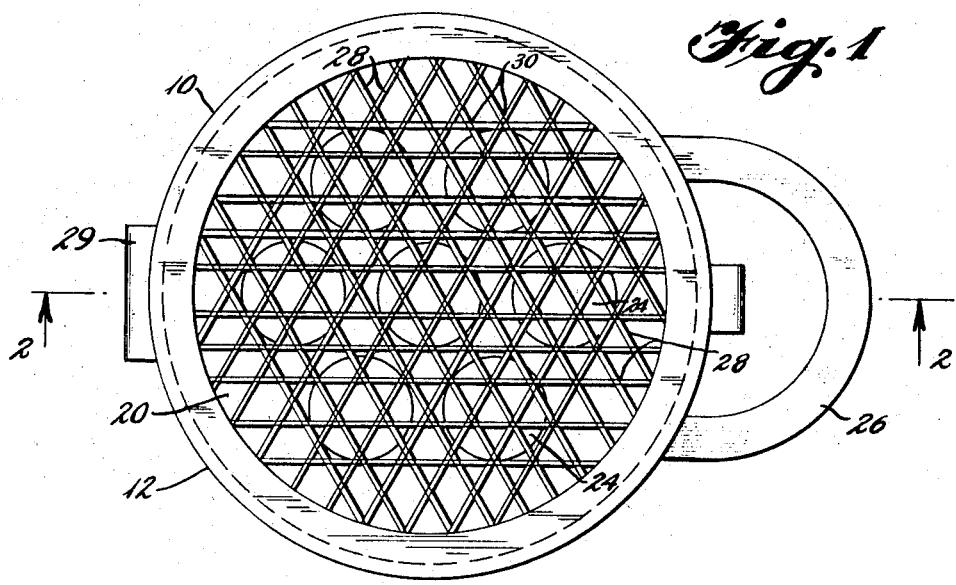
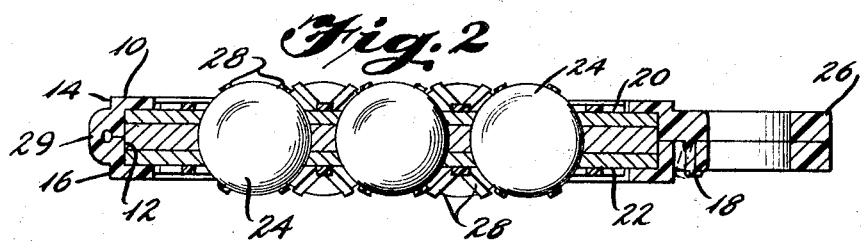
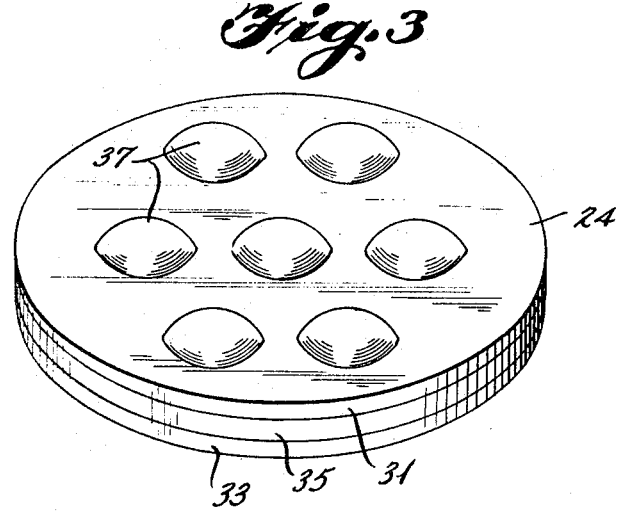

United States Patent Office 3,443,561
Patented May 13, 1969

3,443,561
SUBCUTANEOUS IMPLANT DEVICE
Jack Owen Reed, Englewood, N.J., assignor to Phytogen Products, Inc., Mamaroneck, N.Y., a corporation of Delaware
Filed Aug. 23, 1966, Ser. No. 574,444
Int. Cl. A61m 31/00, 37/00
U.S. Cl. 128—260  5 Claims

ABSTRACT OF THE DISCLOSURE

A depot pellet encasement adapted for subcutaneous implantation with foraminous top and bottom surfaces to permit the enclosed depot pellet to dissolve away in the body fluids yet retain solid fragments of the pellet inside the encasement. An eye member on the encasement permits ready removal from the implantation site.

---

The present invention relates to subcutaneous administration of medicaments and in particular to the encasement of an implant in which the medicament depot is in direct contact with body tissues and fluid (lymph). Importantly, the encasement is adapted to be removed readily taking with it the entire residue of the medicament depot.

Copending application Ser. No. 572,679, filed Aug. 16, 1966, relates to an estrus blocking and enhancement technique adapted for employment on domestic animals which involves administering an estrus blocking medicament by subcutaneous implant. After a 14–18 day residence period the implant is removed, thereby halting administration of the medicament. Within 2–7 days following removal of the implant the animal goes into estrum, and may be serviced or artifically inseminated. It follows then that the implant must include an insoluble stable encasement for the depot, which will hold same securely, preferably in a manner which prevents breakup of the pellet forming the medicament depot. Leaving behind some still unabsorbed medicament particles in the animal (on removal of the implant) is tantamount to continuing the estrus blocking treatment longer than desired, thereby delaying estrum beyond the planned for time period.

The object of the present invention is to provide an encasement for subcutaneous implants of extended duration.

Another object of the invention is to provide an implant encasement adapted to retain securely a medicament pellet without fragmentation thereof. Still another object of this invention is to provide an implant encasement adapted to retain therein the medicament particles, should the depot pellet break-up.

Further objects and the advantages of the present invention will be more apparent from the description thereof which follows.

Referring now to the drawing:

FIG. 1 is a plan view of a medicament pellet and the encasement therefor.

FIG. 2 is a cross-section taken along lines 2—2 of FIG. 1.

FIG. 3 is a diagrammatic view of the medicament pellet adapted for use with the present encasement.

As shown in the drawing encasement 10 is generally circular with an upstanding imperforate ring-like side wall 12 which may be split horizontally (as shown) or vertically into upper half 14 and lower half 16 so that side wall 12 may be opened for placement of a solid depot pellet inside encasement 10. A locking ridge and groove structure may help secure the split halves of side 12 into closed position. Foraminous upper surface 20 and a foraminous lower surface 22 spread across the top and bottom of side wall 12 encase depot pellet 24 therebetween. An eye member 26 is formed in side wall 12 integral therewith so that encasement 10 may be hooked by a suitable instrument and withdrawn from its subcutaneous implant location. The encasement 10 may be formed (e.g. molded from polyethylene) as two separate members or, as shown integral, with a hinge 29 connection between the upper and lower halves with a locking pin 18 diametrically opposite hinge 29.

The implant encasement 10 is formed with foraminous top 20 integral with upper half 14 and foraminous bottom 22 integral with lower half 16. Desirably the top and bottom surfaces are a multiplicity of thin, criss-crossed strips 28 connected at their intersections 30 providing, thereby, a resilient net-like effect which holds implant pellet 24 securely under mild compression and retains even small sized particles inside the encasement 10, should fragmentation or break-up occur during the implant residence period.

The construction of pellet 24 is closely related to that of encasement 10. It is also related both to the temporary nature of the residence of the subcutaneous implant and to the extended duration thereof, e.g. 14–18 days for the estrus blocking technique. For such relatively extended treatment purposes a multilayer large size pellet is preferred, with the active ingredient concentrated in the upper and lower layers 31, 33 from which absorption to the animal occurs. An inert core layer 35 is provided for pellet 24, larger than the two outer layers in order to provide needed bulk for the pellet. The top, and bottom of pellet 24 may be provided with hemispherical elevations 37 which extend above and below side wall 12 to facilitate retention of pellet 24 under a mild compression in encasement 10. It may be seen from the drawing how the net-like surfaces of encasement 10 retains large and even small fragments of depot pellet 24, should fracture occur, allowing complete withdrawal of medicament when loop or eye 26 of encasement 10 is hooked for removal. Also, the encased pellet 24 is resiliently retained by the net-like interconnected strips 28 under mild compression with hemispherical elevations 37 protruding out and bearing against strips 28 top and bottom. In addition, the hemispherical elevations provide a large surface area essentially directly in contact with body tissues for absorption of medicament from the outer layers of pellet 24 during the entire residence period of the implant.

By way of specific example, the following formulation is presented for a 3-layered compressed disc adapted for the estrus blocking technique.

(a) *Formulation for upper and lower layers (each layer)*

|  | Mg. |
|---|---|
| Cholesterol | 100 |
| Active ingredient (3-ethylene dioxy 17-acetoxy, 6-methyl pregn-5-ene-20-one) | 100 |
| Carbowax (4000) (a polyethylene glycol) | 45 |
| Magnesium stearate | 5 |
| Total | 250 |

(b) *Formulation for core layer*

|  | Mg. |
|---|---|
| Cholesterol | 2000 |
| Carbowax (4000) | 450 |
| Magnesium stearate | 50 |
| Total | 2500 |

The above formulations are compounded then compressed in separate layers into the shape shown on FIGURE 3 with the active formulations as the outside layers, using commercially available tableting equipment. When the 3-layer pellets are employed as implants (using a polyethylene foraminous encasement molded in the shape shown by the drawing) on beef cows and heifers, each of the implant pellets remains as a coherent unitary mass despite up to 18 days of implant residence. Examination of the surgically removed implants shows that the upper and lower layers are only partially eroded or dissolved away, and, with rare exception, no pellet disintegration or break-up occurs. Even then no loss of pellet fragments from the encasement occurs. Estrus takes place in the implanted cows and heifers from 2–7 days following removal of the implant.

For further understanding of the invention the details of a preferred implantation technique are now described.

The technique of implantation, using sanitary surgical procedure, in the mid-cervical area, one to two inches ventral to the transverse process of the cervical vertebrae, is to cut a horizontal straight line opening through the skin only, approximately 1.5 inches in length. Introduce a pair of tissue separating forceps ventrally between the skin and the underlying musculature for approximately 1.5 inches, opening the forceps to form a subcutaneous pouch to receive the implant. The forceps are removed and the implant is introduced into the subcutaneous pouch. One or two mattress sutures then close the wound. If implantation is done during the fly season the wound should be protected against blow-fly infestation. The animal is then released from the squeeze-shoot and is allowed to return to pasture.

For removal of the implant, a second incision is made through the skin, immediately below the palpible implant. This incision should be of a half moon shape, apex ventral. The encasement around the residue of the implant pellet is then grasped with a surgical hook or a pair of tissue forceps and withdrawn from its subcutaneous depot site through the wound opening. Again the wound is closed with one or two mattress sutures providing for drainage at the apex, should irritation develop.

It should be apparent from the foregoing description that the structure of encasement 10 and of pellet 24 can be varied without departing from the spirit thereof, and that therefore the invention is to be broadly construed in accordance with the hereto appended claims.

What is claimed is:

1. A depot pellet encasement adapted for subcutaneous implantation comprising an enclosing side wall; a foraminous top surface, and a foraminous bottom surface, said side wall and top and bottom surfaces being adapted to retain under mild compression therebetween a depot pellet; and an eye member formed integral with said side wall adapted to be grasped by a hook member for removal of said encasement from its implantation site.

2. An encasement according to claim 1 wherein said side wall is split into separable halves so that a depot pellet may be inserted between the opened halves.

3. An encasement according to claim 1 containing a solid depot pellet having at least one hemispherical elevation on an outer surface thereof said pellet being maintained under mild compression between said foraminous top and bottom surfaces.

4. An encasement according to claim 1 wherein the top and bottom surfaces further comprise a plurality of interconnected strips providing thereby a resilient net-like effect.

5. An encasement according to claim 4 containing therein a depot pellet characterized by a plurality of hemispheric elevations on the outer surfaces thereof, said elevations protruding above said side wall and bearing resiliently against said strips.

References Cited

UNITED STATES PATENTS

| 1,543,629 | 6/1925 | Taylor | 128—361 |
| 2,539,036 | 1/1951 | Schwab | 128—260 |

FOREIGN PATENTS

| 415,219 | 8/1934 | Great Britain. |

ADELE M. EAGER, *Primary Examiner.*